W. E. LINCOLN.
Milk-Cooler.
No. 219,359. Patented Sept. 9, 1879.
Fig:1.
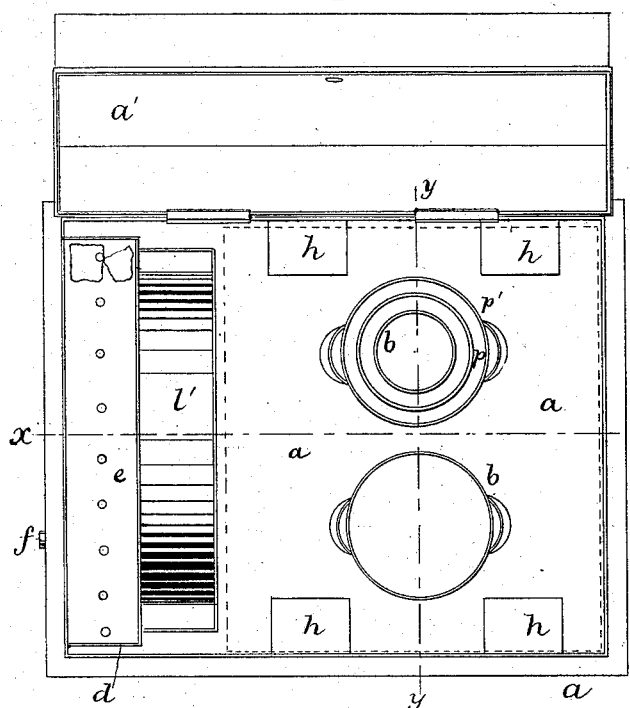
Fig:2.
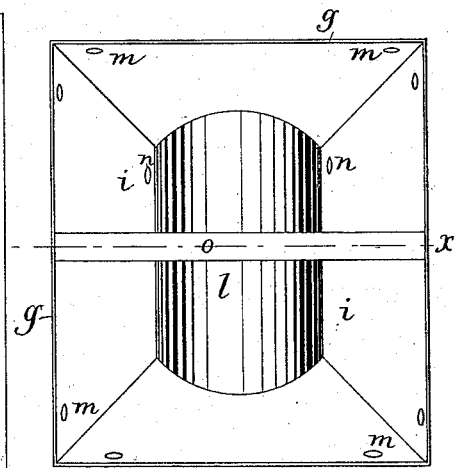
Fig:3.
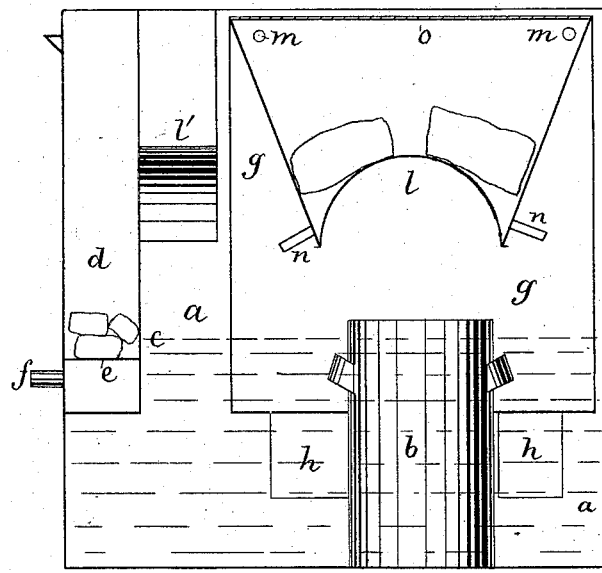
Fig:4.
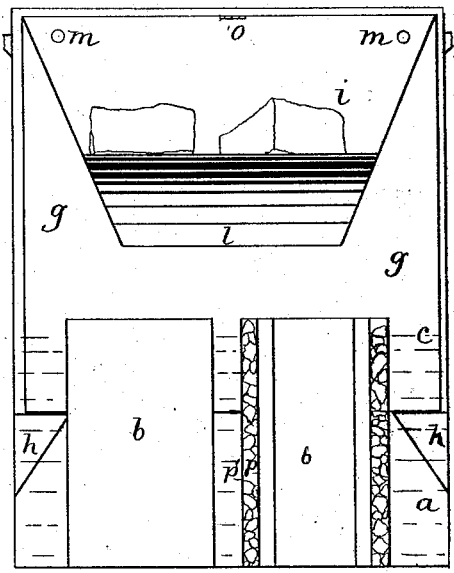
Witnesses
Jos. P. Livermore
J. T. Cronin
Inventor
William E. Lincoln,
by Crosby Gregory
Atty

UNITED STATES PATENT OFFICE.

WILLIAM E. LINCOLN, OF WARREN, MASSACHUSETTS.

IMPROVEMENT IN MILK-COOLERS.

Specification forming part of Letters Patent No. 219,359, dated September 9, 1879; application filed July 21, 1879.

*To all whom it may concern:*

Be it known that I, WM. E. LINCOLN, of Warren, county of Worcester, State of Massachusetts, have invented an Improvement in Apparatus for Obtaining Cream from Milk, of which the following description, in connection with the accompanying drawings, is a specification.

My invention relates to an apparatus for obtaining cream from milk by lowering the temperature thereof in uncovered vessels placed in water and acted upon by cold air.

It has been customary to hasten the separation of the cream from the milk by placing the vessels containing the milk in cool water, the lowering of the temperature being favorable to the separation of the two fluids. The water has usually been cooled by pieces of ice placed therein; but such method is very wasteful of ice. In one process now in use the cans are wholly submerged under water, the water being prevented from entering the cans by an inverted cap, which traps a certain amount of air, which becomes impregnated with animal impurities, and, unless removed by drawing off the water and removing the cover or inverted cap, will impart a disagreeable flavor to the contents of the can and the products manufactured therefrom.

In my apparatus uncovered milk-containing vessels are placed in water, which rises nearly to the top thereof, and the said vessels are covered and protected from external atmospheric influence by a chamber containing air cooled by ice, or other usual cooling mixture, contained in a depression in the upper part of the said chamber, which is placed over the milk-vessels. The lower edge of this chamber may dip under the water surrounding the vessels, thereby forming a perfect air-chamber. This arrangement of the ice in an air-chamber above the milk allows the cool air to descend upon the upper surface of the milk, which should be placed in the apparatus while still warm from the cow, and consequently at a much higher temperature than the ice-cooled air, which consequently causes a rapid circulation of the particles of milk and cream being cooled, which has been found to be highly conducive to the separation. A circulation is also set up in the water surrounding the cans.

The ice is found to last much longer when placed in a dry receptacle in the air-chamber than when placed directly in the water surrounding the cans.

The depression or receptacle for ice in the upper part of the air-chamber is preferably formed with an arching or inclined bottom, forming an arched or pitched roof to extend over the milk-vessels, to allow water of condensation formed upon the under side of the roof to pass beyond the milk-vessels and drop into the water surrounding them.

The air-chamber is provided with small holes at its upper portion to allow the warm air and gaseous impurities to pass out, and thus give a gentle circulation to the air in the air-chamber; and also with an eduction-pipe to carry away the water formed by the melting of the ice.

To regulate or cool the body of water surrounding the milk-vessels, I provide an ice-chamber, which I term a "regulator," at one portion of the tank containing the water, the said ice-chamber being preferably water-tight and extending below the level of the water surrounding the milk-vessels, and provided with an orifice outside the water-tank to allow the drip from the melting ice to pass off, this arrangement enabling ice to be kept below the level of the water in the tank. This regulator may be provided with a laterally-extended arched or pitched can-covering roof, located above the water-level, and with an aperture beneath said extension, through which the cool air may pass and sink upon the upper surface of a vessel or can of milk placed under it. When this laterally-projecting roof is employed, the air-chamber heretofore described will be omitted; but the air-chamber is the preferable form of my invention.

If desired, the milk-vessels may be placed in a larger or auxiliary vessel, which is immersed in the cold water, such an arrangement allowing the cool air to circulate between the said two vessels; and, if desired, a third vessel may be placed about the auxiliary vessel, with sufficient space to allow ice or cooling material to be placed between it and said auxiliary vessel.

Figure 1 is a top view of my improved refrigerating apparatus with the air-chamber removed, its position being indicated by dotted lines; Fig. 2, a top view of the air-chamber; Fig. 3, a section on the line $x\,x$ of Fig. 1; and Fig. 4, a section on line $y\,y$ of Fig. 1, the air-chamber being in place.

The main case or tank $a$ contains the milk-vessels $b\,b$, shown as cylindrical in form and open or uncovered at top. The tank $a$ is filled with water nearly to the top of the milk-vessels $b$, as shown by the line $c\,c$, Figs. 3 and 4, the said water and the interior of the tank being kept cool by the mass of ice or other cooling material in the regulator $d$, which preferably extends below the water-level, as shown in Fig. 3, and is provided a perforated platform or grating, $e$, upon which the ice rests, and a pipe, $f$, to allow the water resulting from the melting of the ice to pass off, either directly from the tank, or the said pipe may be led through the water in the tank.

The air-chamber $g$, preferably of such size as to cover six or eight cans, is shown as supported by suitable brackets or props $h$, attached to the tank $a$, and is provided with an ice-containing portion or receptacle, $i$, preferably having an arched or inclined bottom to form a roof to span or cover the space occupied by the vessels or cans $b$, a roof of such shape acting to prevent the water of condensation formed thereon from dropping therefrom into the milk. This receptacle $i$ has orifices or spouts $n$, to carry the drip from the melting ice beyond the milk-vessels, so that it may fall into the water surrounding them, as does the water of condensation from the lower ends of the roof portion.

The air-chamber is provided at its upper portion with small holes $m$, to allow the warmer air and gases arising from the milk to escape, thus allowing a constant change of air in the air-chamber.

The handle $o$ enables the air-chamber to be readily removed to place the milk-vessels in the tank or remove them. Instead of this air-chamber, I may project from the regulator an arched or inclined roof, $l'$, it being of a proper size to extend over and beyond the uncovered milk-containing vessels $b$, as hereinbefore described.

Instead of placing the milk in the vessels $b$ in direct contact with the water, it may be placed in smaller vessels within larger auxiliary vessels $p$, the main vessels preferably having feet or legs, to elevate the bottoms of the main vessels and permit a free circulation of cold air entirely about the main vessel; or, if desired, I may inclose the auxiliary vessel $p$ within a third vessel, $p'$, leaving sufficient space between the said vessels $p$ and $p'$ for the reception of ice or other refrigerating substance; but with this latter form of apparatus the water in the tank may, if desired, be omitted.

The tank $a$ may be provided with a suitable cover, $a'$, Fig. 1, which should have perforations to allow the warmer air and gases to escape from the interior of the tank.

I claim—

1. In an apparatus for obtaining cream from milk, an inclosing-tank for the milk-containing vessels, combined with an ice-receptacle having an arched or inclined bottom, serving as a roof to cover the milk-vessels, substantially as described.

2. In an apparatus for obtaining cream from milk, a water-tank to contain vessels of milk, combined with a removable cover having an ice-receptacle, the bottom of the cover being adapted to dip into the water in the tank, and thus form a closed air-chamber, substantially as described.

3. In an apparatus for obtaining cream from milk, a water-containing tank and a connected ice-receptacle extended below the level of the water in the said tank, substantially as and for the purpose described.

4. In an apparatus for obtaining cream from milk, a milk-containing vessel and a surrounding auxiliary vessel to permit the circulation of air about the milk-containing vessel, combined with a water-holding tank in which the auxiliary vessel is partially immersed, and with an ice-receptacle and a roof to cover the milk-vessel, substantially as described.

In testimony whereof I have signed my name to this specification in the presence of two subscribing witnesses.

WILLIAM E. LINCOLN.

Witnesses:
G. W. GREGORY,
N. E. WHITNEY.